United States Patent Office 2,913,330
Patented Nov. 17, 1959

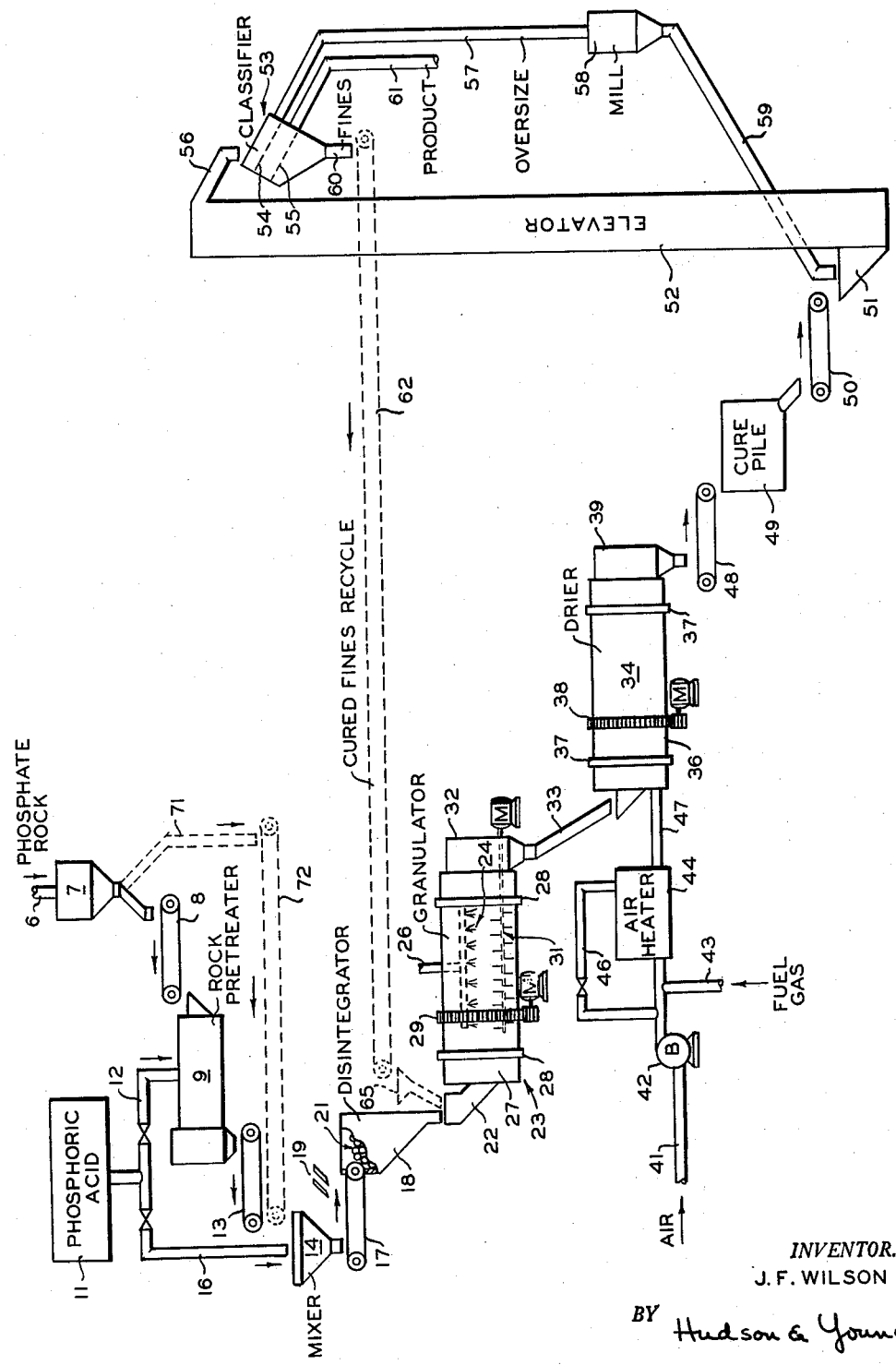

2,913,330

MANUFACTURE OF TRIPLE SUPERPHOSPHATE

Joseph F. Wilson, Bartlesville, Okla., assignor to Phillips Petroleum Company, a corporation of Delaware Application June 27, 1956, Serial No. 594,245

7 Claims. (Cl. 71—41)

This invention relates to the manufacture of triple superphosphate. In one aspect, it relates to the continuous manufacture of granulated or nodulized triple superphosphate from phosphate rock and phosphoric acid.

In the past, trends in mechanization in the manufacture of triple superphosphate have led to various continuous processes and away from a variety of den processes which take their name from the large receptacle or den into which each batch of acid and phosphate rock mixture is dumped after mixing and cured in bulk piles. These recent trends have been motivated by ever increasing demands for triple superphosphate and for a product having a maximum amount of available phosphorous pentoxide and having good physical properties.

The efficient production of granulated or nodulized triple superphosphate has been found limited because periodic shutdowns of equipment frequently occur due to the presence of a sticky or gummy product. As a result, maintenance costs are high and production is often low.

Accordingly, an object of this invention is to provide an improved manufacturing process for the production of triple superphosphate.

Another object is to eliminate or substantially reduce the occurrence of a sticky, gummy product in triple superphosphate process equipment.

A further object is to obviate the high maintenance costs and low production heretofore encountered in triple superphosphate manufacture due to the occurrence of a sticky, gummy product.

Other objects and advantages of my invention will become apparent, to those skilled in the art, from the following discussion and appended claims.

Triple superphosphate (45 to 50% phosphorus pentoxide), sometimes known as double, treble, or concentrated superphosphate, is made by an acidulation of phosphate rock with phosphoric acid according to the equation:

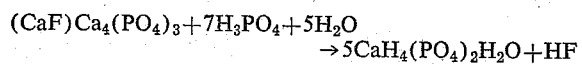

$$(CaF)Ca_4(PO_4)_3 + 7H_3PO_4 + 5H_2O \rightarrow 5CaH_4(PO_4)_2 H_2O + HF$$

By convention, the phosphorus content of any type of phosphoric fertilizer is expressed as phosphoric acid anhydride ($P_2O_5$). Most commonly, the term phosphoric acid is used to denote the $P_2O_5$ content. The difference between the total $P_2O_5$ content of a fertilizer and the fraction that is insoluble in ammonium citrate solution is the portion caused to be available to use of the plant and hence is named available $P_2O_5$ or available phosphoric acid. In the fertilizer trade, it has long been the custom to express the quantity of phosphate rock in terms of tricalcium phosphate, altho tricalcium phosphate is seldom, if ever, found in phosphate rock as such.

Broadly contemplated, the above mentioned objects are achieved according to the practice of my invention by either pretreating the ground dry, phosphate rock with a small amount of the total phosphoric acid required by the process, or by blending cured product fines with the phosphate rock-phosphoric acid reaction product at a stage in the process prior to the drying of the same, or a combination of these steps.

In order to facilitate the understanding of the present invention, reference will now be made to the single drawing which is a diagrammatic representation of a system for treating the raw materials to produce the desired product according to the present invention.

Where stickiness is to be eliminated by pretreating the phosphate rock with a small amount of phosphoric acid, the phosphate rock required for triple superphosphate manufacture is transferred from a fine rock storage silo (not shown) by line 6 to a fine rock hopper 7. The phosphate rock is accordingly weighed and conveyed from the fine rock hopper 7 by a fine rock feeder conveyer belt 8 to a rock pretreater 9 which can be either spray or fog equipment or a high speed mixer. Concentrated phosphoric acid is pumped from a concentrated acid storage tank 11 through line 12 to the rock pretreater 9. All of the phosphate rock required for the production of triple superphosphate is thus pretreated with a small quantity of phosphoric acid and the $P_2O_5$ content of the rock is thereby initially enriched. The pretreating acid is thoroughly blended with the rock and is used only in such quantity as can be applied and leave the rock in a free flowing and apparently dry form.

This treated rock is passed from the pretreater 9 by a pretreated rock conveyor belt 13 to a cone or cyclone type mixer 14. It may be desirable in some instances to pass the pretreated rock to storage and receive the final treatment with the remaining acid at some later date (e.g. 2 to 3 days) or it may be shipped in this form for the final acid treatment elsewhere.

Concentrated phosphoric acid from storage tank 11 is transferred through line 16 to mixer 14 where the final treatment of the pretreated rock with the remaining acid occurs. The acid supplied by line 16 to the mixer 14 can be split into a plurality of streams or jets and is injected into the mixer 14 tangentially so that the acid will wash the sides of the mixer 14 as it mixes with the pretreated rock. A very rapid reaction ensues between the acid and the finely divided pretreated rock particles.

The resulting dry triple superphosphate is conveyed from the mixer 14 by a reaction belt 17 to a disintegrator 18. A plurality of spaced knives generally designated in the drawing as 19 can be installed if desired along a cross-section of the reaction belt 17 and cut the dry triple superphosphate product into strips before it reaches disintegrator 18. The strips of dry product passed to the disintegrator 18 are broken into small pieces by squirrel-cage type cylinders or wheels generally designated 21.

The discharge from the disintegrator 18 is passed to hopper 22 and thence to a mixer such as a granulator generally designated 23, as is well known in the art. If necessary, a plurality of water sprays 24 are provided inside of granulator 23 supplied by water conduit 26 and provide sufficient moisture, if needed, to cause the product particles to agglomerate into pellets as they are tumbled inside the granulator 23. Generally the water is sprayed in a sufficient amount so that the material discharged from the granulator 23 is agglomerated to particles of desired sizes in the form of pellets. Granulator 23 comprises a shell 27 mounted on trunnion rolls 28 rotated by bull gear 29 and a separately driven internal horizontal paddle mechanism 31 rotates in a direction opposite to the rotation of shell 27.

The pellets of triple superphosphate discharged from the granulator hood 32 are passed by line 33 to a drier generally designated 34 to complete the reaction. Drier 34, similar to granulator 23, comprises a rotatable shell 36, trunnion rolls 37, bull gear 38 and discharge hood 39. Air in line 41 forced by blower or rotary fan 42 is mixed with the fuel gas from line 43 and burned in the air heater 44 insulated with fire brick. Secondary or tempering air is introduced by line 46 into the air heater 44 to cool the products of combustion to the desired temperature before they are allowed to enter the drier 34 by line 47. The temperature of the hot air used as a drying medium must be rigidly controlled because overheating of phosphorus in the triple superphosphate causes it to revert to a form that is not available to plants and is no longer valuable as a fertilizer. Normally, the air inlet temperature is maintained at about 625–650° F. and the granule temperature is about 195–210° F.

The discharge from drier 34 is conveyed by means of a conveyor belt 48 or the like to a cure pile 49 and thence by a conveyor belt 50 to the boot 51 of a product elevator 52, which can be of the bucket type. The drier discharge will be generally cured in the cure pile 49 for a time sufficient to reduce the free acid content in the triple superphosphate as low as possible for satisfactory processing. This period will generally be about seven days. The product elevated in elevator 52 is conveyed to a screen classifying unit generally designated 53 which is provided with vibrating screens 54, 55 or the like. The discharge from the product elevator 52 is discharged from line 56 onto the top screen deck 54. The material that remains on this deck is returned by line 57 to a hammer mill 58 for crushing and the resulting discharge therefrom is conveyed by line 59 to the boot 51 of the elevator 52. The size of the material that passes through the top screen deck 54 and remains on the lower screen deck 55 is within the desired product limits and is sent by means of line 61 to bulk storage and bagging machines (not shown) for subsequent sale. The need of the customer will determine the mesh size of the screens to be used.

It is essential that the ground rock and the pretreating acid be thoroughly blended in the pretreater 9. The pretreating acid is preferably sprayed onto tumbling phosphate rock. Alternatively, the pretreating acid and the ground rock can be mixed at high speed in a mixer, ball mill or the like. The time required for the pretreating step will thus depend upon the pretreating equipment employed; this time will generally be at least two minutes and frequently the blending can be continued for ten to fifteen minutes. After thorough blending, the enriched rock can be passed to the second acid-pretreating step where triple superphosphate is produced or it can be stored and treated at a later date. The pretreated rock is generally ready to be treated with the remaining acid after ten to twelve minutes if the extent of blending is good or at least after sixty minutes if the extent of blending is poor.

The amount of phosphoric acid used in the pretreating step is generally in the range between 4 and 15%, preferably 8 to 13%, of the total acid required to yield a triple superphosphate product having at least 46 weight percent of available $P_2O_5$. The amount of acid required in the pretreating step to eliminate stickiness is governed to a certain extent by the total amount of acid employed in the production of the triple superphosphate. If the total amount of acid is lowered, the amount used in the pretreating step, and also its concentration, can be lowered. The concentration of the acid in the second acid-treating step is the same as that used in the pretreating step.

The marked reductions in stickiness of the triple superphosphate product by pretreating the phosphate rock with phosphoric acid according to the practice of my invention, has been demonstrated and the following example illustrates the effectiveness of my invention.

EXAMPLE I

Finely ground phosphate rock, containing 34.5 grams $P_2O_5$ per 100 grams phosphate rock by analysis, was treated in a high speed mixer (Waring Blendor) with phosphoric acid having a concentration, expressed as $P_2O_5$, of 53 weight percent. The acidulation ratio was 1:2.7 in all runs. Temperature of the phosphate rock was 100° F. and the temperature of the phosphoric acid was 175° F. One run was made as a control in which the phosphate rock was treated in one step with the total quantity of acid. Four runs were made in which a portion of the acid was used in a pretreating step and the remainder was added later to convert the pretreated material to triple superphosphate. The rock remained free flowing and apparently dry after the pretreating step. The total quantity of acid employed was the same in all cases. The time intervals between the pretreating and final acid treating steps was varied in the different runs.

The stickiness of the triple superphosphate products was determined and rated on each sample after a 15-minute reaction period subsequent to the addition of the total quantity of acid. A rating of "5" signifies a non-sticky material having a high bulk density and one which is not plastic when pinched between the fingers. A rating of "4" indicates traces of stickiness which will cause a relatively small accumulation of the product in the drier and screens. A rating of "3" indicates a sticky-plastic mass.

Phosphate rock used in the first three runs was ground to a size which would pass through a 200 mesh screen. That used in the last two runs was ground to a size such that 70 percent would pass through a 200 mesh screen.

The results of this experiment are tabulated in the following table.

Table I

| | Runs | | | | |
|---|---|---|---|---|---|
| | 1 (control) | 2 b | 3 b | 4 c | 5 d |
| Recipe, grams $P_2O_5$ in: | | | | | |
| Raw rock | 34.5 | 34.5 | 34.5 | 34.5 | 34.5 |
| Pretreating acid | None | 3.5 | 11.1 | 11.1 | 11.1 |
| Acid for TSP a production | 93.2 | 89.7 | 82.1 | 82.1 | 82.1 |
| Weight percent of total acid used in rock pretreatment | 0.0 | 3.76 | 11.90 | 11.90 | 11.90 |
| Product analysis after 15-minute reaction period: | | | | | |
| Free acid, weight percent— | | | | | |
| Wet basis | 10.0 | 9.9 | 10.2 | 10.3 | 10.7 |
| Dry basis | 10.9 | 10.8 | 11.1 | 11.5 | 11.9 |
| $P_2O_5$, weight percent— | | | | | |
| Citrate insoluble: | | | | | |
| Wet basis | 3.2 | 3.2 | 4.0 | 4.17 | 3.98 |
| Dry basis | 3.5 | 3.5 | 4.4 | 4.6 | 4.4 |
| Available: | | | | | |
| Wet basis | 46.4 | 46.3 | 45.8 | 44.9 | 45.0 |
| Dry basis | 50.7 | 50.9 | 50.2 | 50.2 | 50.4 |
| Water, weight percent | 9.3 | 10.0 | 9.6 | 10.1 | 10.0 |
| Stickiness rating | 3 | 4 | 5 | 5– | 5 |
| Product analysis, 7-day cure: | | | | | |
| Free acid, weight percent— | | | | | |
| Wet basis | 3.1 | 3.3 | 3.3 | 3.5 | 3.2 |
| Dry basis | 3.2 | 3.5 | 3.4 | 3.6 | 3.3 |
| $P_2O_5$, weight percent— | | | | | |
| Citrate insoluble: | | | | | |
| Wet basis | 2.0 | 2.2 | 2.1 | 2.6 | 2.0 |
| Dry basis | 2.1 | 2.3 | 2.2 | 2.7 | 2.1 |
| Available: | | | | | |
| Wet basis | 50.1 | 49.6 | 50.5 | 49.1 | 50.1 |
| Dry basis | 52.1 | 52.1 | 52.4 | 51.2 | 52.2 |
| Water, weight percent | 3.8 | 4.8 | 3.7 | 4.0 | 4.0 | a Triple superphosphate.
b Pretreated rock aged 3 days.
c Three minute delay between rock pretreatment and TSP manufacture.
d Forty-five minute delay between rock pretreatment and TSP manufacture.

The data in the above table indicate that by pretreatment of the ground phosphate rock with a portion of the total phosphoric acid and subsequent use of this resulting dry, enriched phosphate rock in the usual triple superphosphate process, a dry, non-sticky product is produced at acidulation ratios representative of present production practice. Using 53 percent acid, up to 13 percent of the total acid, for example, can be put in the untreated phosphate rock and still maintain it in a dry and free-flowing form.

Referring again to the drawing, where stickiness is to be eliminated by blending cured product fines with the green triple superphosphate, all of the ground phosphate rock is transferred from the fine rock hopper 7 by line 71 and conveyor belt 72 to the mixer 14. Simultaneously, all of the phosphoric acid is transferred from acid storage tank 11 by line 16 to the mixer 14. The resulting mixture remains fluid for only a short period, and while in this fluid phase it is transferred to the reaction belt 17 where it becomes plastic after a few seconds and then changes to a porous solid. The total time for the mixture to solidify sufficiently for further processing will generally vary in the range between 5 and 20 minutes depending upon the fineness and grade of rock used and the strength and purity of the phosphoric acid. The reaction belt 17 is to provide sufficient retention time for the reaction to proceed until the material is solid. Solid triple superphosphate from the reaction belt 17 is then passed to the mixer 23.

Cured triple superphosphate fines which pass through the product or lower screen deck 55 in the screen classifying unit 53 are conveyed by means of line 62 to the hopper 22 of mixer 23. The green triple superphosphate supplied from the disintegrator 18 is blended in mixer 23 with the cured fines. This blending step substantially reduces or eliminates the stickiness of the green triple superphosphate without any increase in the available $P_2O_5$ or increase in the citrate insoluble $P_2O_5$. Alternatively, the cured triple superphosphate fines can be introduced into the system at any point between the reaction belt 17 and the drier 34. The blended product is subsequently processed according to the manner described hereinbefore in regard to the elimination of the stickiness by pretreating the phosphate rock with a small amount of phosphoric acid.

It is essential for optimum results that thorough blending of the cured fines with the green triple superphosphate be achieved. The time required for blending cured fines of a given mesh size will depend upon the efficiency of the equipment employed and can range from a few seconds to several minutes. The size of the cured fines will generally be in the range between 20 and 100 mesh and the amount employed will generally be in the range between 5 and 75 weight percent, preferably between 10 and 40 weight percent, based on the phosphate rock charged. The amount will be determined largely by the stickiness of the green triple superphosphate, the size of the cured fines, and the efficiency of the blending. The finer the fines and better the blending, the less cured fines required.

The marked reductions in stickiness of the triple superphosphate product produced by blending cured fines with the green triple superphosphate according to the practice of my invention has been demonstrated and the following example illustrates the effectiveness thereof.

EXAMPLE II

Phosphate rock containing 34.5 grams $P_2O_5$ per 100 grams phosphate rock by analysis, was ground to a size such that 70% would pass through a 200 mesh screen. This finely ground phosphate rock was thoroughly blended with phosphoric acid having a concentration, expressed as $P_2O_5$, of 53 weight percent. A motor driven stirrer was employed and the blending time was approximately 15 seconds. The acidulation ratio, i.e., $P_2O_5$ in rock:$P_2O_5$ in acid expressed on a weight basis, was 1:2.9. The temperature of the rock was 100° F. and the temperature of the acid was 175° F. The mixture was allowed to stand 15 minutes after which samples were removed for analyses. The mixture was dried in an air heated rotary drier (air inlet temperature 625 to 650° F.) for 20 minutes, after which it was placed in a container provided with a small breather opening where it was aged for 7 days. Samples were again removed for analysis. This run was used as a control.

Two runs were made in the manner described above except that after the acid and rock were blended and the mixture was allowed to stand 15 minutes, fines from a previous run which had been aged 21 days and which had a mesh size of approximately 40 to 60 were added and the mixtures were blended by stirring rapidly for 10 seconds. Two different quantities of fines were used. The blends were dried, aged for 7 days, and analysis made. The results of this experiment are tabulated in the following table.

*Table II*

| | Run | | |
|---|---|---|---|
| | 1 (control) | 2 | 3 |
| Recipe, grams: | | | |
| Raw rock | 100 | 100 | 100 |
| Phosphoric acid | 188 | 188 | 188 |
| $P_2O_5$ in raw rock | 34.5 | 34.5 | 34.5 |
| $P_2O_5$ in acid | 99.6 | 99.6 | 99.6 |
| Fines, grams/100 grams raw rock | 0 | 10 | 30 |
| Product analysis after 15-minute reaction period: | | | |
| Free acid, weight percent— | | | |
| Wet basis | 13.9 | 11.3 | 7.6 |
| Dry basis | 15.7 | 12.6 | 8.4 |
| $P_2O_5$, weight percent— | | | |
| Citrate insoluble: | | | |
| Wet basis | 4.14 | 3.81 | 3.2 |
| Dry basis | 4.61 | 4.13 | 3.5 |
| Available: | | | |
| Wet basis | 45.8 | 44.7 | 45.4 |
| Dry basis | 52.2 | 49.9 | 50.3 |
| Water, weight percent | 12.3 | 10.3 | 9.8 |
| Stickiness rating | 3+ | 4 | 5 |
| Product analysis, 7-day cure: | | | |
| Free acid, weight percent— | | | |
| Wet basis | 6.3 | 3.8 | 2.7 |
| Dry basis | 6.6 | 4.0 | 2.9 |
| $P_2O_5$, weight percent— | | | |
| Citrate insoluble: | | | |
| Wet basis | 3.40 | 2.89 | 1.91 |
| Dry basis | 3.54 | 3.04 | 2.00 |
| Available: | | | |
| Wet basis | 49.0 | 48.5 | 48.6 |
| Dry basis | 51.2 | 51.0 | 51.6 |
| Water, weight percent | 4.2 | 4.9 | 6.0 |
| Stickiness rating | 4 | 4+ | 5 |

Three additional runs were made in the manner described above except that the acidulation ratio was 1:2.7. The first run was used as a control, and instead of using fines from a previous reaction as the additive for the other runs, calcium carbonate and calcium oxide were employed for purposes of comparison. Results were as follows:

*Table III*

| | Run | | |
|---|---|---|---|
| | 1 (Control) | 2 | 3 |
| $CaCO_3$, grams/100 grams raw rock | 0 | 15 | |
| $CaO$, grams/100 grams raw rock | 0 | | 8.4 |
| Product analysis after 15-minute reaction period: | | | |
| Available, $P_2O_5$, wet basis, weight percent | 45.3 | 44.2 | 44.6 |
| Water, weight percent | 10.1 | 11.1 | 10.9 |
| Stickiness rating | 3+ | 4 | 4 |
| Product analysis, 7-day cure: | | | |
| Available $P_2O_5$, wet basis, weight percent | 48.2 | 47.2 | 45.2 |
| Water, weight percent | 5.0 | 2.8 | 6.0 |
| Stickiness rating | 4 | 5 | 4+ |

As mentioned hereinabove, it is within the scope of my invention to employ and combine the steps of pretreating the phosphate rock with a small amount of the total phosphoric acid required, with the step of blending the green triple superphosphate product with cured triple superphosphate fines in a single process. The combination of these steps will be dictated in the main by economic considerations. Thus, since the major portion of the cured triple superphosphate is often in the form of fines or material too small to meet product specifications, it is desirable to utilize these fines in such a manner that substantial stickiness of the product can be reduced. As such, the amount of phosphoric acid used in the pretreating step will be smaller than that required where the stickiness of the product is eliminated only by the pretreating step. Accordingly, the following example demonstrates the effectiveness of combining these steps to eliminate the stickiness of the product.

EXAMPLE III

Phosphate rock, containing 34.5 grams $P_2O_5$ per 100 grams rock by analysis is ground to a size which will pass through a 200 mesh screen and treated in a high speed mixer with phosphoric acid having a concentration, expressed as $P_2O_5$, of 53 weight percent. The acidulation ratio, i.e., $P_2O_5$ in rock:$P_2O_5$ in acid, expressed on a weight basis is 1:2.7. Temperature of the rock is 100° F. and temperature of the treating acid is 175° F. A portion of the acid (3.76 weight percent of the total) is used in a pretreating step and the remainder is added later to convert the pretreated material to triple superphosphate. A sample treated in this manner has a stickiness rating of 4, indicating that there will be a relative small accumulation of the product in the drier and screens. The stickiness rating is determined on a sample after a 15-minute reaction period subsequent to the addition of the total quantity of acid. Fines from a previous run which have been aged 21 days and which have a mesh size of approximately 40–60 are added to the triple superphosphate using 10 parts by weight per 100 parts by weight of raw rock (rock before treatment with phosphoric acid). Blending is accomplished by rapid stirring for 10 seconds. The product is a free-flowing, non-sticky material as indicated by a stickiness rating of 5 after a 15-minute drying period and again after aging 7 days.

The phosphoric acid employed in the practice of my invention has a concentration in the range between 40 and 60 weight percent, preferably in the range between 47 and 55 weight per cent, expressed as $P_2O_5$. The total acid employed in terms of the acidulation ratio is generally in the range between 1:2.0 to 1:3.0, and preferably in the range between 1:2.15 to 1:2.8.

It is desirable that the free acid in the product be kept as low as possible for packaging purposes. After curing, it should not exceed 5 weight percent and is preferably below 3.5 weight percent, the amounts being expressed as $P_2O_5$.

Various modifications of my invention will become apparent, to those skilled in the art, without departing from the scope and spirit of my invention, and it is to be understood that the foregoing discussion and examples are set forth as illustrative of the preferred method of practicing my invention and it is not to be unduly limited thereto.

I claim:

1. A process for the continuous manufacture of triple superphosphate, comprising, in combination, the steps of pretreating phosphate rock with a first quantity of phosphoric acid, mixing the resulting pretreated rock with a second quantity of phosphoric acid, blending substantially all of the resulting solid green triple superphosphate with cured triple superphosphate fines, and drying and classifying the resulting blend, said first quantity of phosphoric acid being an amount within the range between 4 and 15 weight percent of the total phosphoric acid required and said second quantity of phosphoric acid being the balance of said total phosphoric acid required to bring the acidulation ratio up to the desired level.

2. In a process for the continuous manufacture of triple superphosphate, in which phosphate rock is mixed with phosphoric acid in a mixing zone, the resulting solid green triple superphosphate is discharged from said mixing zone and passed to a granulation zone, dried in a drying zone and cured, and the cured triple superphosphate classified in a classification zone, the improvement comprising pretreating said rock with about 4 to 15 weight percent of the total phosphoric acid necessary to bring the acidulation ratio up to the desired level, mixing the resulting pretreated rock with the balance of said total phosphoric acid to produce green triple superphosphate, and blending substantially all of said green triple superphosphate with cured triple superphosphate fines obtained from said classification zone.

3. The process according to claim 2, wherein the concentration of phosphoric acid is within the range between 40 and 60 weight percent expressed as $P_2O_5$, said acidulation ratio is within the range between 1:2.0 and 1:3.0 expressed as $P_2O_5$, and the amount of cured triple superphosphate fines employed is within the range between 5 and 75 weight percent based on said phosphate rock.

4. A process for the continuous manufacture of triple superphosphate, comprising, in combination, the steps of pretreating phosphate rock with a first quantity of phosphoric acid, mixing the resulting pretreated rock in a mixing zone with a second quantity of phosphoric acid, blending the resulting green triple superphosphate with between 5 and 75 weight percent of cured triple superphosphate fines based on said phosphate rock, drying and curing the resulting blend, and classifying the resulting cured triple superphosphate, said first quantity of phosphoric acid being an amount in the range between 4 and 15 weight percent of the total phosphoric acid required to bring the acidulation ratio up to the desired level and said second quantity of phosphoric acid being the balance of said total phosphoric acid.

5. In a process for the continuous manufacture of triple superphosphate, in which finely divided phosphate rock is mixed with phosphoric acid in a mixing zone, the resulting green triple superphosphate is discharged from said mixing zone and passed to a granulation zone, dried in a drying zone and cured, and the cured triple superphosphate classified in a classification zone, the improvement comprising pretreating said rock with about 4 to 15 weight percent of the total phosphoric acid required to bring the acidulation ratio up to the desired level, mixing the resulting pretreated rock with the balance of said total phosphoric acid, and blending the resulting green triple superphosphate with between 10 and 40 weight percent of cured triple superphosphate fines based on said rock.

6. The process according to claim 5 wherein the concentration of phosphoric acid is within the range between 40 and 60 weight percent expressed as $P_2O_5$, said acidulation ratio is within the range between 1:2.0 and 1:3.0 expressed as $P_2O_5$, and the amount of phosphoric acid employed in the pretreating step is within the range between 4 and 15 weight percent of the total phosphoric acid required.

7. The process according to claim 5 wherein the concentration of phosphoric acid is within the range between 47 and 55 weight percent expressed as $P_2O_5$, said acidulation ratio is within the range between 1:2.15 and 1:2.8 expressed as $P_2O_5$, and the amount of phosphoric acid employed in the pretreating step is within the range between 8 and 13 weight percent of the total phosphoric acid required.

References Cited in the file of this patent

UNITED STATES PATENTS

| | | |
|---|---|---|
| 2,448,126 | Shoeld | Aug. 31, 1948 |
| 2,598,658 | Procter et al. | May 27, 1952 |
| 2,680,680 | Coleman | June 8, 1954 |